(12) United States Patent  
Tost et al.

(10) Patent No.: US 9,189,453 B2  
(45) Date of Patent: Nov. 17, 2015

(54) METHOD AND DEVICE FOR VERIFYING THE CONSISTENCY OF THE SIDESLIP PROBES OF AN AIRCRAFT

(71) Applicant: AIRBUS OPERATIONS (SAS), Toulouse (FR)

(72) Inventors: Frédéric Tost, Toulouse (FR); Christoph Heinen, München (DE)

(73) Assignee: Airbus Operations (SAS), Toulouse (FR)

( * ) Notice: Subject to any disclaimer, the term of this patent is extended or adjusted under 35 U.S.C. 154(b) by 101 days.

(21) Appl. No.: 13/780,319

(22) Filed: Feb. 28, 2013

(65) Prior Publication Data

US 2013/0261877 A1 Oct. 3, 2013

(30) Foreign Application Priority Data

Mar. 1, 2012 (FR) ...................................... 12 51898

(51) Int. Cl.
*G06F 17/00* (2006.01)
*G01P 13/02* (2006.01)
*G01P 21/00* (2006.01)

(52) U.S. Cl.
CPC .............. *G06F 17/00* (2013.01); *G01P 13/025* (2013.01); *G01P 21/00* (2013.01)

(58) Field of Classification Search
CPC ......... G01P 13/025; G01P 5/165; G01P 5/16; G01P 3/62; B64D 43/00; G06F 17/00
USPC ............... 701/14, 29.8, 4, 6, 7; 356/519, 337, 356/28.5
See application file for complete search history.

(56) References Cited

U.S. PATENT DOCUMENTS

| | | | |
|---|---|---|---|
| 5,616,861 A | 4/1997 | Hagen | |
| 2002/0166375 A1* | 11/2002 | Cronin et al. | 73/170.02 |
| 2004/0011124 A1* | 1/2004 | Choisnet et al. | 73/170.02 |
| 2009/0099811 A1 | 4/2009 | Spoerry et al. | |
| 2009/0112498 A1* | 4/2009 | Krone | 702/69 |

OTHER PUBLICATIONS

French Search Report dated Aug. 6, 2012 in FR 1251898.

* cited by examiner

*Primary Examiner* — Helal A Algahaim
*Assistant Examiner* — Jelani Smith
(74) *Attorney, Agent, or Firm* — Nixon & Vanderhye P.C.

(57) ABSTRACT

The invention pertains to a method for verifying the consistency of the values ($\beta 1, \beta 2, \beta 3$) given by the sideslip probes (1,2,3) of an aircraft and to a device implementing this method. This method is noteworthy in that it consists in consolidating the values of two sideslip probes by using the value of the incidence $\alpha$.

17 Claims, 5 Drawing Sheets

METHOD AND DEVICE FOR VERIFYING THE CONSISTENCY OF THE SIDESLIP PROBES OF AN AIRCRAFT

This application claims priority to French Patent Application No. 20120051898 filed Mar. 1, 2012, the entire contents of which are hereby incorporated by reference.

BACKGROUND OF THE INVENTION

1. Field of the Invention

The invention pertains to a method for verifying the consistency of the sideslip probes of an aircraft and to a device implementing this method.

2. Discussion of Prior Art

The piloting of any aircraft requires a knowledge of its relative speed with respect to the air, that is to say to the relative wind. This speed is determined with the aid of sensors of static pressure Ps, of the total pressure Pt, of the angle of incidence $\alpha$ and of the angle of sideslip $\beta$.

The angle of incidence $\alpha$ of an aircraft is commonly defined as being the angle of the air speed vector with respect to a horizontal plane of the aircraft. Likewise, the angle of sideslip $\beta$ of an aircraft is defined as being the angle of the air speed vector with respect to a vertical plane, generally a symmetry plane, of the aircraft.

The values of $\alpha$ and of $\beta$ are conventionally estimated by known techniques, for example on the basis of a measurement of the pressure of the air outside the craft, as is the case in patent EP 1 354 212 B1. These pressure measurements are taken by probes arranged on the surfaces of the aeroplane. These probes can be of the Pitot or multifunction type (MFP).

Sideslip probes which do not use the measurement of the pressure are beginning to be used on civil aeroplanes. These probes dispatch an electrical signal as a function of time, indicative of the locally measured sideslip angle.

Sets of such probes with so-called weathervanes, also dubbed fins, generally comprise three probes fitted on the nose of the craft. The arrangement of such a set on an aircraft is illustrated in FIG. 3.

In this figure, the central plane X of the craft C is the symmetry plane of the fuselage, coinciding with the plane of the rudder. The probes 1, 2, 3 are arranged on the nose of the craft C, the two probes 1, 2 being symmetrically situated on either side of the plane X and the probe 3 being situated in the plane X. The three probes 1,2,3 are substantially aligned along a straight line Y perpendicular to the plane X of the aeroplane. This system of three probes is generally situated on the nose Cp of the craft C.

In probes of the weathervane type, it is difficult to detect a failure of the probe due to the deformation or displacement of the weathervane. FIG. 1 represents such a type of weathervane probe. The weathervane G overhangs the base S which is fitted in the fuselage. It is understood that the weathervane G is a sensitive part of the probe since it is subjected to the exterior environment.

It is known from patent EP 1 354 212 B1 to verify the consistency between three measurement probes by applying the triplex principle.

According to this principle, it is possible to note a defect on a measurement pathway when one of the probes of this pathway gives a very different result from the other two. It is then deduced therefrom that this pathway is defective. Nonetheless, within this pathway, the defective probe remains indeterminate.

The triplex principle is illustrated in FIG. 2. In FIG. 2a, the probes 2 and 3 indicate an angular sideslip value of 3° for probe 2 and of 3.1° for probe 3. Probe 1 gives for its part a value of 8° very different from the others. The measurements of probe 1 are therefore rejected.

In other cases, the application of the triplex principle may in particular turn out to be insufficient. Indeed, when two probes give erroneous but mutually consistent information, the correct measurement is rejected. This case is illustrated in FIG. 2b. Probe 1 gives a value of 8° and probe 3 gives a value of 8.1°. This information is erroneous but mutually consistent. Probe 2 gives a value of 3°, this in fact being the correct value of sideslip angle, but the application of the triplex principle means that it is the measurements of this probe 2 which are rejected.

It is therefore necessary to know whether the information given by the sideslip probes is correct, so as to indicate to the computer whether or not it may take this information into account.

A first solution consists in arranging a greater number of probes than that necessary for the measurements or else in installing a system of additional checking probes as is described in patent EP 1 354 212. However, these solutions lead to difficulties of integrating these systems into aeroplanes.

A second solution consists in estimating the value of the sideslip and in comparing the estimated value with the measured value so as to detect errors, if any, which may arise subsequent to the sole application of the triplex principle. This solution is effective and is generally employed on craft of modern design. In order to further increase flight safety, provision may be made to supplement this solution with means for verifying the consistency of the measurements of the sideslip probes.

One of the objectives of the invention is to provide a system for verifying the consistency of the sideslip probes which does not require the installation of additional probes.

SUMMARY OF THE INVENTION

The aim of the present invention is to remedy the aforementioned drawbacks and in particular to propose a method for verifying the consistency of the measurements of a first sideslip probe and of a second sideslip probe mounted on an aircraft, the first sideslip probe providing a first sideslip angle measurement signal and the second sideslip probe providing a second sideslip angle measurement signal, the method comprising the following successive steps:

a step of subtraction to obtain a discrepancy signal for the two sideslip angle measurement signals, a step of processing the discrepancy signal and an angle of incidence measurement signal for the aircraft by filtering means to obtain a filtered discrepancy signal and a filtered angle of incidence measurement signal, and a step of comparing the filtered discrepancy signal and the filtered angle of incidence measurement signal to detect an inconsistency between the measurements of the first and second probes.

This method is noteworthy in that it consolidates the values of two sideslip probes by using the value of the incidence $\alpha$. The aim of this method is therefore to propose a simple, effective and robust device, which can be easily adapted to an already existing system of sideslip probes and which can indicate to the computer of a craft to take or not to take into account the measurements of the sideslip probes.

Advantageously, the step of processing the discrepancy signal and the angle of incidence measurement signal comprises the following steps:

a step of amplifying the discrepancy signal to obtain an amplified discrepancy signal, a step of filtering the amplified discrepancy signal to obtain the filtered amplified discrepancy signal, and a step of filtering the angle of incidence measurement signal to obtain a filtered angle of incidence measurement signal.

Advantageously, the comparison step comprises the following successive steps:

a step of subtracting the filtered angle of incidence measurement signal from the filtered amplified discrepancy signal to obtain a difference signal, a step of detection to detect the amplitude discrepancies of the difference signal that are greater than a predetermined threshold, a step of counting the number of amplitude discrepancies thus detected, a step of computing an error density on the basis of the number of amplitude discrepancies thus detected during a predetermined time period, a step of comparing the value of the error density with a predetermined reference density value to provide a boolean signal of consistency in the case where the value of the error density remains less than the predetermined value of the reference density or of non-consistency in the case where the value of the error density is greater than the reference value.

The invention also pertains to a device which implements this method. Thus, the invention relates to a device for verifying the consistency of the measurements of a set of at least three sideslip probes mounted on an aircraft, the set being characterized in that it comprises modules for checking the consistency of the probes of the set taken pairwise, each of the modules for checking the consistency of the probes receiving as input a first sideslip angle measurement signal originating from a first probe of the set, and a second sideslip angle measurement signal originating from a second probe of the set, each module for checking consistency comprising:

subtraction means to obtain a discrepancy signal for the two sideslip angle measurement signals, means for processing the discrepancy signal and an angle of incidence measurement signal for the aircraft to obtain a filtered discrepancy signal and a filtered angle of incidence measurement signal, means for comparing the filtered discrepancy signal and the filtered angle of incidence measurement signal to identify an inconsistency between the first and second signals received.

Advantageously, the processing means comprise:

means for amplifying the discrepancy signal by a gain K, means for filtering the amplified discrepancy signal to obtain a filtered amplified discrepancy signal, means for filtering the angle of incidence measurement signal to obtain a filtered angle of incidence measurement signal.

Advantageously, the comparison means comprise:

subtraction means to subtract the filtered angle of incidence measurement signal from the filtered amplified discrepancy signal to obtain a difference signal, detection means to detect amplitude discrepancies of the difference signal that are greater than a predetermined threshold, means for counting the number of amplitude discrepancies thus detected, computation means to compute an error density on the basis of the number of amplitude discrepancies thus detected during a predetermined time period and to compare the value of the error density with a reference density and provide a boolean signal as a function of this comparison.

Advantageously, the device furthermore comprises a validation means to validate or invalidate the check of the consistency of the probes. This validation means is configured to provide a boolean signal indicating whether the consistency check performed in each of the modules for checking the consistency of the probes is valid or invalid as a function of validity parameters.

BRIEF DESCRIPTION OF THE DRAWINGS

Other characteristics and advantages of the invention will become apparent on reading the preferential embodiment of the invention given with reference to the attached figures among which:

FIG. 2 described supra is composed of FIGS. 2a and 2b.

FIG. 9 is composed of the graphics 9a and 9b. The graphic 9a represents the angular measurement signal of a seized probe and the graphic 9b illustrates the principle of the detection of the seizure of the probe of FIG. 9a.

DETAILED DISCUSSION OF EMBODIMENTS

Aircraft are equipped with incidence and sideslip probes. In practice, one and the same probe can be used either to measure the incidence or to measure the sideslip according to its location on the skin of the aircraft.

The probes used according to the invention are of the weathervane type, that is to say they comprise a weathervane mounted on a pivot in such a way that the weathervane is positioned in the local air stream, parallel to the relative wind of the craft.

Figure 1:
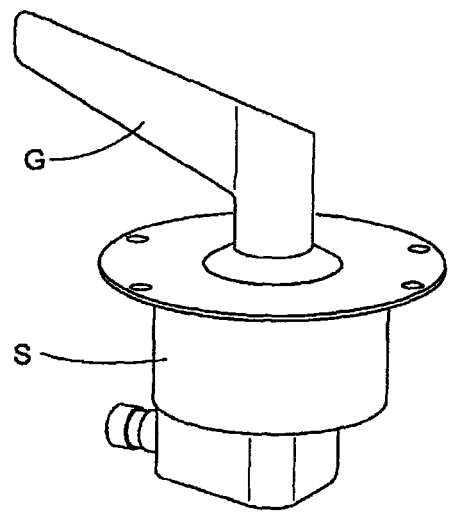
FIG. 1 described supra represents a probe of the weathervane type used in the invention.
Figure 2A:
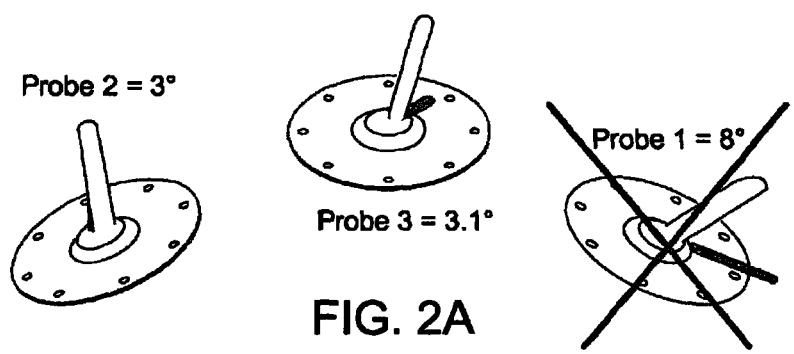
FIG. 2a illustrates a set of three probes where one of the probes gives an erroneous value very different from those provided by the other two probes.
Figure 2B:
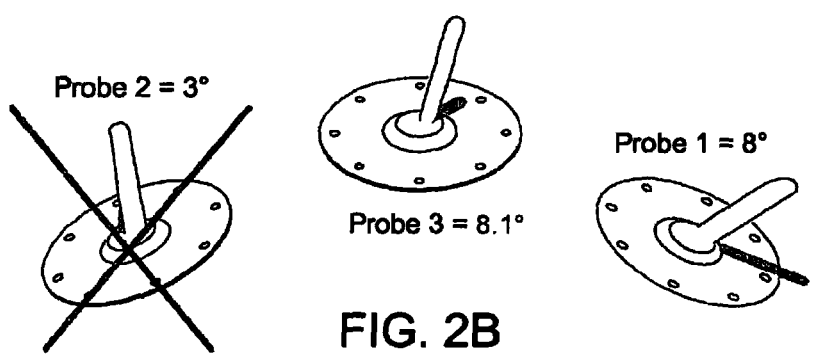
FIG. 2b illustrates the problem posed by the sole application of the triplex principle in a set of three probes.

An example of such a sideslip probe has already been described in conjunction with FIG. 1.

These probes situated at sensitive places on the aeroplane may be damaged by ground maintenance operations, in particular through the use of ladders or of cleaning lances, particular meteorological conditions or impacts of birds in flight. They may therefore get blocked, twisted or broken.

Figure 3:
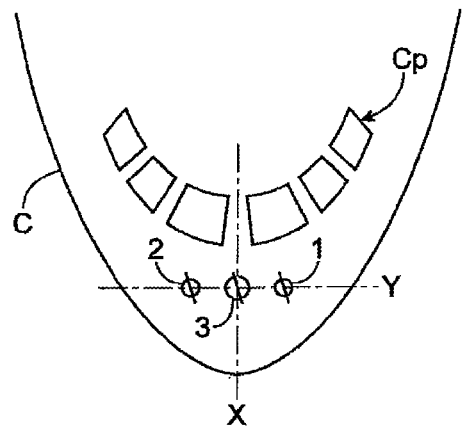
FIG. 3 represents the arrangement of a set of three sideslip probes on the nose of an aircraft.

Advantageously, the sideslip probes are placed at the front of the craft as illustrated by FIG. 3, so that the air stream is as undisturbed as possible. The probes are advantageously situated on the nose of the aeroplane and in a preferential manner in a region situated between the cockpit and the front undercarriage of the craft.

In the subsequent description, it is assumed that the three sideslip probes are arranged as illustrated in FIG. 3.

This arrangement of three probes 1,2,3 is however wholly non-limiting of the invention and the person skilled in the art may envisage another arrangement.

It is understood that a physical correlation exists between the incidence of an aeroplane and the sideslip, since these two values are related to the relative speed of the aircraft with respect to the air. This is confirmed in an experimental manner.

The idea underlying the invention is to utilize this physical correlation to verify the consistency of the sideslip probes of an aircraft. It should be noted that it is known to use the angle of incidence to correct the estimated sideslip of an aircraft, in particular in application US 2009/0099811 A1. The present invention uses the angle of incidence to verify consistency between the angles of sideslip measured by the sideslip probes.

The solution proposed by the invention consists in consolidating the values of two sideslip probes by using the value of the incidence of the aeroplane, knowing the physical correlation between these values.

Figure 4:
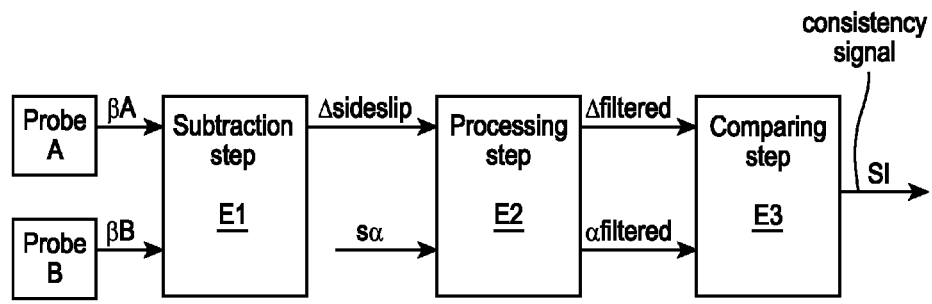
FIG. 4 represents the steps of the method for verifying consistency between two sideslip probes according to an embodiment of the invention.

FIG. 4 schematically illustrates the method for verifying the consistency of the measurements of the sideslip probes according to an embodiment of the invention. This method is noteworthy in that it uses the measurements of a first sideslip probe A and of a second sideslip probe B which are mounted on an aircraft and the measurement of angle of incidence of the aircraft. The probe A provides a first sideslip angle measurement signal $\beta A$ and the sideslip probe B provides a sideslip angle measurement signal $\beta B$.

The method in question comprises the following steps:

a step E1 of subtraction to obtain a discrepancy signal, $\Delta$sideslip, for the two sideslip angle measurement signals $\beta A$ and $\beta B$, a step E2 of processing the discrepancy signal, $\Delta$sideslip, and an angle of incidence measurement signal, sa, for the aircraft by filtering means to obtain a filtered discrepancy signal, $\Delta$filtered, and a filtered angle of incidence measurement signal, $\alpha$filtered, and a step E3 of comparing the filtered discrepancy signal, $\Delta$filtered, and the filtered angle of incidence measurement signal, $\alpha$filtered, to detect an inconsistency, if any, between the measurements of the probes A and B.

On completion of step E3, the method makes it possible to obtain a signal SI. The signal SI is a boolean signal indicating the consistency or the non-consistency of the measurements of the probes A and B.

Figure 5:
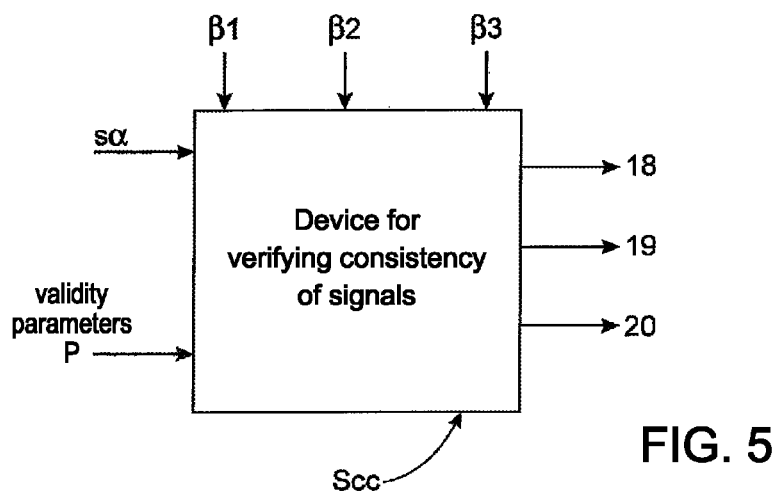
FIG. 5 represents in a schematic manner the inputs/outputs of the device for verifying consistency according to an embodiment of the invention.

The invention also relates to a device for checking consistency of the measurements of a set of three sideslip probes, using the method described in FIG. 4, to verify the consistency of the three probes 1,2,3 taken pairwise. FIG. 5 shows the inputs/outputs of the consistency checking device Scc. This device is integrated into the electronics of the aircraft and makes it possible to indicate to the computer whether the sideslip information is valid or invalid.

This device Scc comprises modules for checking consistency to verify the consistency of the measurements of the probes and a validation means.

Each of the checking modules is suitable for performing the method of the invention for two probes taken pairwise from among the set of three probes. The validation means makes it possible to validate or to invalidate the check of the consistency of the probes performed in each checking module as a function of the given validity parameters P.

The inputs of the device for verifying consistency according to an embodiment of the invention are:

the value of angle of incidence represented by a signal, $s\alpha$, dispatched to the device. It will be possible to compute the value of the incidence of the aeroplane by any means known to the person skilled in the art, advantageously by probes of weathervane type which measure the orientation of the relative wind with respect to a vertical plane of the aeroplane, the validity parameters P, the value of sideslip angle measured by probe 1, represented by a signal $\beta 1$ dispatched to the device, the value of sideslip angle measured by probe 2, represented by a signal $\beta 2$ dispatched to the device, the value of sideslip angle measured by probe 3, represented by a signal $\beta 3$ dispatched to the device.

The outputs of the device are:

a boolean signal 18 of consistency of probes 1 and 2, a boolean signal 19 of consistency of probes 2 and 3, a boolean signal 20 of consistency of probes 1 and 3.

Figure 6:
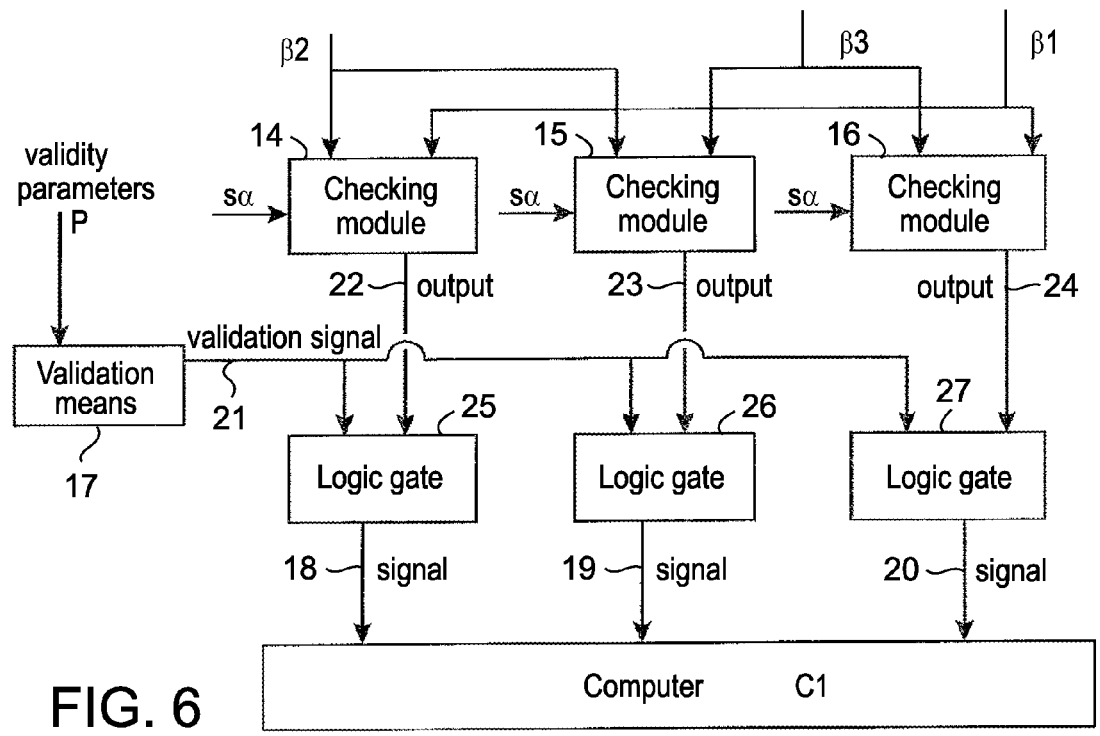
FIG. 6 represents in a schematic manner the structure of the device for verifying consistency in an embodiment according to the invention.

FIG. 6 represents in a schematic manner the structure of the device for verifying consistency according to an embodiment of the invention and illustrates the identical operation of the checking modules 14,15,16. Each checking module 14,15,16 receives as input two signals of angular values $\beta 1$, $\beta 2$, $\beta 3$ measured by two different probes 1,2,3 as well as the value of angle of incidence of the aeroplane $s\alpha$.

Each checking module 14,15,16 verifies the consistency of the values measured by two probes taken pairwise from among the three probes 1,2,3, by carrying out three operations:

filtering of the signals of sideslip values $\beta 1$, $\beta 2$, $\beta 3$, filtering of the incidence value signal $s\alpha$, and verification of the consistency of the measurements.

Each checking module 14,15,16 indicates whether the angular values $\beta 1$, $\beta 2$, $\beta 3$ measured by two sideslip probes are mutually consistent. The output of each checking module 22,23,24 is therefore a boolean signal indicating the consistency or the non-consistency of two probes.

In the case where a checking module 14,15,16 indicates a consistency between two probes, then the measurements of the two probes $\beta 1$, $\beta 2$, $\beta 3$ ($\beta 1$ & $\beta 3$, $\beta 2$ & $\beta 3$, and $\beta 1$ & $\beta 2$) whose consistency has been verified by this module will be taken into account by the computer C1 of the aeroplane subject to validation by the validation means 17.

In the case where a checking module 14,15,16 indicates a non-consistency between two probes, then the measurements of the two probes in question will not be taken into account by the computer C1.

The checking module 14 receives as input $\beta 1$ and $\beta 2$ together with sa and produces a boolean signal 22 indicating whether the measurements of probes 1 and 2 are consistent or non-consistent. The checking module 15 receives as input $\beta 2$ and $\beta 3$ together with $s\alpha$ and produces a boolean signal 23 indicating whether the measurements of probes 2 and 3 are consistent or non-consistent. The checking module 16 receives as input $\beta 1$ and $\beta 3$ together with $s\alpha$ and produces a boolean signal 24 indicating whether the measurements of probes 1 and 3 are consistent or non-consistent.

The validation means 17 receives as input validity parameters P and produces a boolean validation signal 21, indicating whether the check is valid or invalid.

Each checking module 14,15,16 is linked to an AND logic gate 25,26,27 and each of the three AND logic gates 25,26,27 receives respectively as input the boolean output signal 22,23, 24 from the checking module 14,15,16 to which it is linked and the boolean output signal 21 from the validation means 17. The additional safety afforded by the presence of the validation means 17 is clearly seen here.

The case where a single logic gate dispatches a signal indicating an inconsistency is not possible.

The computer C1 of the aircraft uses the values of the measurements of the three probes β1,β2,β3 to compute the corrections, if any, to be performed on the control surfaces of the craft. The device according to the invention such as represented in FIG. 6 makes it possible to indicate to the computer C1 which probe measurement is to be taken into account, by virtue of the signals 18,19,20 and 21. The device according to the invention does not transmit any probe measurements to the computer C1. The measurements of the probes 1,2,3 are transmitted to the computer C1 either directly or indirectly by passing if appropriate through intermediate systems, but this departs from the framework of the present invention.

A logic configuration between the various means of the invention, other than the configuration illustrated in FIG. 6, can be envisaged by the person skilled in the art. A variant embodiment of the invention may thus be to transmit the boolean signals 22,23,24 and 21 directly to the computer, which will be able to determine the consistency or the inconsistency of the measurements of the probes and the validity or the invalidity of the consistency checks. Another variant consists in using logic gates 25,26,27 of OR type when the validation signal 21 and the signals 22,23,24 are in negative logic.

Figure 7:
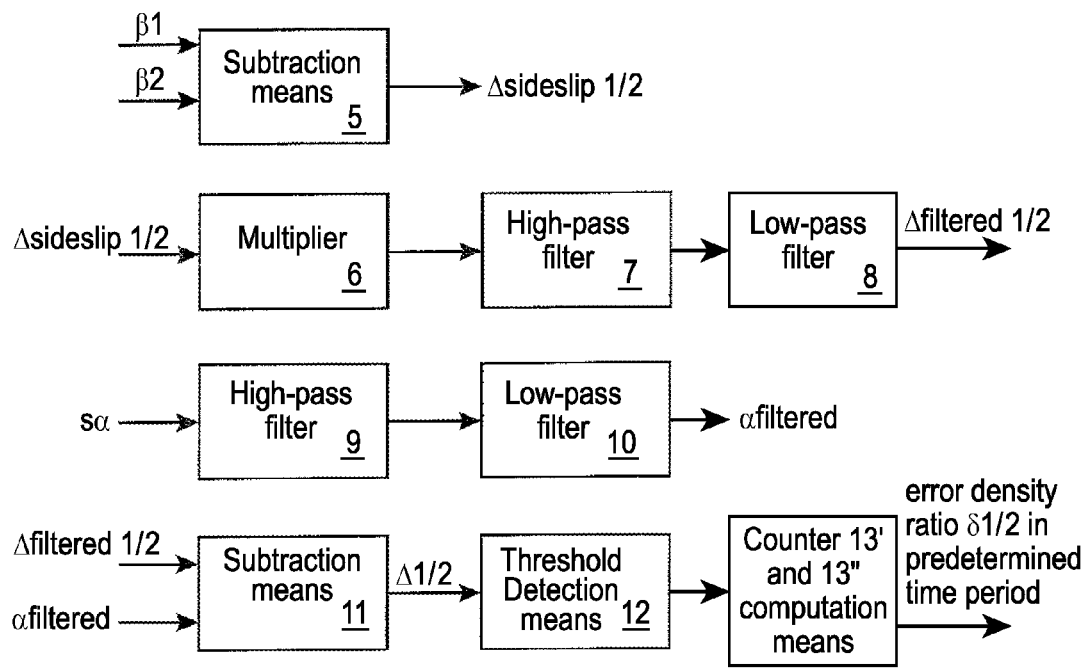
FIG. 7 illustrates the operation performed in a checking module according to the invention.

The operations performed in the checking modules 14,15, 16 will be described hereinafter in conjunction with FIG. 7. This figure specifically describes the operations performed in the checking module 14 but the description of the operations performed in the checking modules 15 and 16 would be identical for the respective inputs and outputs of the checking modules 15 and 16. Indeed, the means used being the same in each module, only the inputs and the outputs are different.

The module 14 checks the operation of the probes 1 and 2: the signal β2 is subtracted from the signal β1 at the level of the subtraction means 5, thereby giving an angular discrepancy signal 1/2, denoted Δsideslip 1/2.

This signal Δ1/2 is multiplied by a gain K in the multiplier 6 so as to adjust the level of this discrepancy in order to compare it with the angle of incidence signal sα. The choice of K will be determined readily by the person skilled in the art.

The angular discrepancy signal thus adjusted is thereafter filtered by a bandpass filter. This bandpass filter decomposes into a high-pass filter 7 for removing the noise of the signal Δsideslip 1/2 and a low-pass filter 8 for removing its continuous component therefrom. Only the variations of the signal are thus taken into account subsequently in the method. This filtered signal is denoted Δfiltered1/2. The order of the low-pass and high-pass filters is immaterial.

The incidence signal sα is also filtered by a bandpass filter, which decomposes into a high-pass filter 9 for removing the noise of the signal sα and a low-pass filter 10 for removing its continuous component. Thus only the variations of the signal sα are taken into account subsequently in the method. This filtered signal is denoted αfiltered. The order of the low-pass and high-pass filters is immaterial.

To verify the consistency between the measurements of the probes 1 and 2, the signal Δfiltered1/2 and the signal αfiltered are compared. Thus, the signal Δ1/2 corresponds to (Δfiltered1/2−αfiltered). These signals Δfiltered1/2−αfiltered are subtracted by the subtraction means 11.

A solution for verifying the consistency of β1 and of β2 consists in detecting the amplitude discrepancies of the signal Δ1/2 that are greater than a predetermined threshold, by virtue of the detection means 12.

This threshold makes it possible to fix a tolerance on the amplitude discrepancies.

Upon each overstepping of this threshold, a counter 13' is incremented and computation means 13" compute an error density δ1/2.

The error density δ1/2 is defined as the ratio of the number of errors appearing in the course of a predetermined time period. A time of a few tens of seconds, and advantageously of the order of 40 seconds, is chosen. This value makes it possible to detect an inconsistency under good safety conditions.

If the error density δ1/2 is greater than a reference density, then the measurements of the probes 1 and 2 are non-consistent. In this case the measurements of the two probes 1 and 2 are not taken into account by the computer C1.

If the error density is less than a reference density, the measurements of the probes 1 and 2 are declared to be consistent. The measurements of the probes 1 and 2 are taken into account by the computer C1 with the proviso that the check of the probes is validated by the validation means 17. If it is not validated, the measurements of the probes 1 and 2 are not taken into account by the computer C1.

Figure 8:
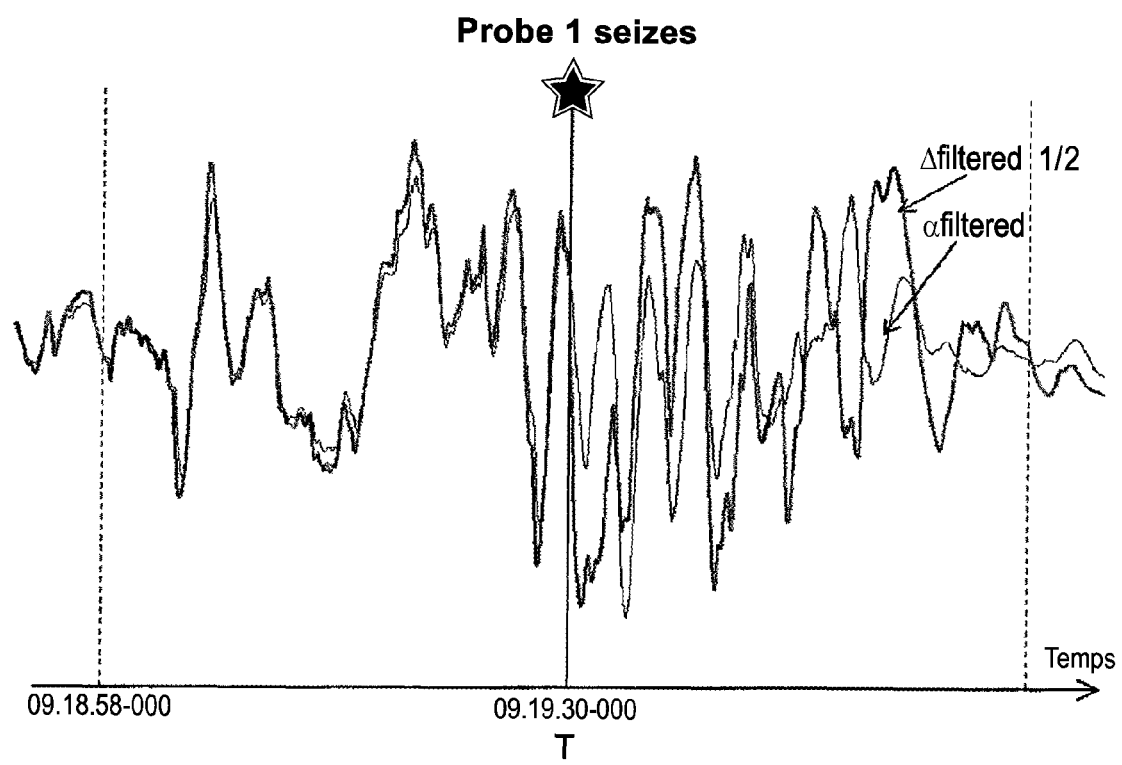
FIG. 8 illustrates the principle of detecting the seizure of a seized probe by means of the module of FIG. 7.

FIG. 8 illustrates the principle of detecting the seizure of a probe. Here the term "seizure" signifies that the probe is no longer operating or is operating in an abnormal manner. The probe which is used for this demonstration is the probe 1 and the consistency checking module used is the module 14.

Before seizure at the time T, the curve of Δfiltered 1/2 follows the curve of αfiltered fairly faithfully. Once the probe 1 has seized, a divergence exists between the curve of Δfiltered 1/2 and the curve of αfiltered.

If the curve representing the signal Δ1/2 (not represented in FIG. 8) had been computed and plotted, the curve representing this signal would have been quasi-constant and of quasi-zero value up to the instant T (09.19.30-000) where the probe 1 seizes, and then the curve would have exhibited spikes after this instant. The detection means 12 would therefore have detected these amplitude discrepancies provided that they had crossed the predetermined threshold value.

The predetermined threshold value is chosen sufficiently high to tolerate the measurement noise. The measurements of the probes 1 and 2 are thus prevented from being declared inconsistent in the case of small discrepancies in amplitude.

The counter 13' counts all these amplitude discrepancies, and an error density is computed by the error density computer 13" by taking into account the number of amplitude discrepancies computed over a predetermined time period.

If this density δ1/2 is greater than a predetermined density threshold, then the checking module 14 produces a boolean signal 22 indicating the non-consistency of the measurements of the probes 1 and 2.

If this density δ1/2 is less than a predetermined density threshold, the consistency checking module 14 produces a boolean signal 22 indicating the consistency of the measurements of the probes 1 and 2.

Figure 9A:
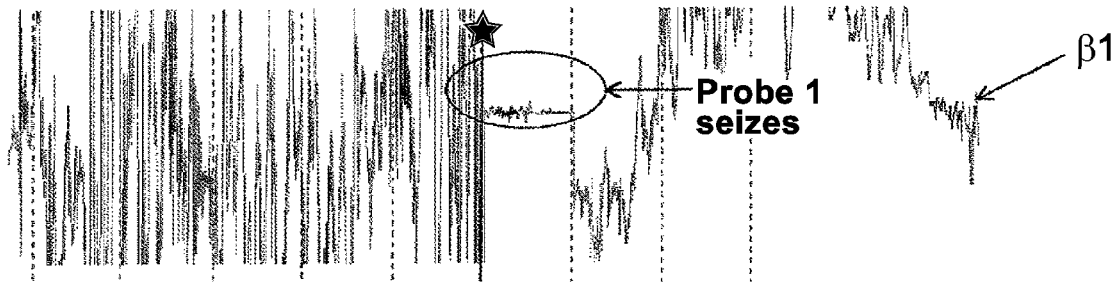

FIG. 9 illustrates the principle of detecting a seized probe from among the three probes. The device according to the invention has been tested with three probes one of which, probe 1, has been seized intentionally at the time T as may be seen in FIG. 9a representing the signal β1.

Indeed, on the curve representing the signal β1, seizure of the probe 1 is observed at the time T. The probe 1 no longer gives angular variations, under experimental conditions where it ought to give them.

The curves Δ1/2, Δ2/3, Δ1/3 correspond to the difference between Δfiltered1/2, Δfiltered2/3 and Δfiltered1/3 respectively and the filtered incidence αfiltered.

Figure 9B:
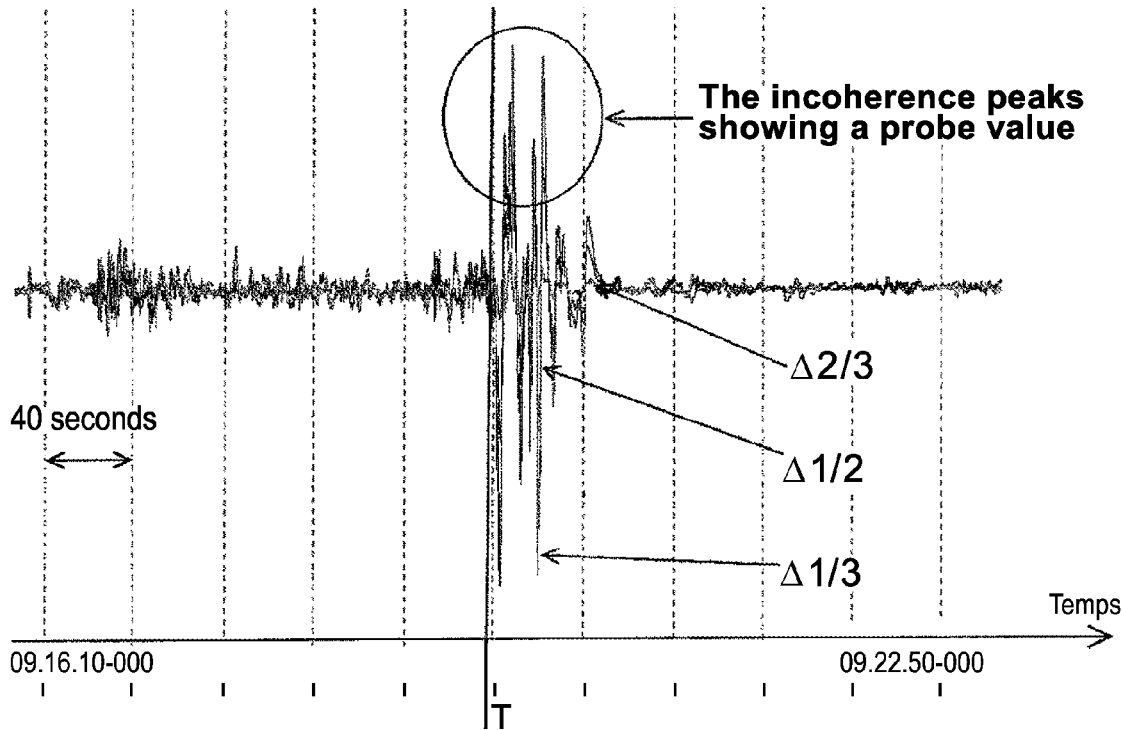

It can be seen in FIG. 9b that, before the time T of seizure of the probe 1, the curves Δ1/2, Δ2/3, Δ1/3 are quasi-constant. Next, from the time T, the spikes on the curves Δ1/2 and Δ1/3 show the detection of the inconsistency between probes 1 and 3 on the one hand, and probes 1 and 2 on the other hand. The curve Δ2/3 always remains substantially constant. It is deduced therefrom that probe 1 is nonfunctional.

It will be noted that this experiment makes it possible to retrieve the nonfunctional probe, since here checking modules 14 and 16 indicate an inconsistency, and checking module 15 indicates a consistency. It is therefore the values of probes 2 and 3 which are taken into account by the computer C1 (subject to the validity of the measurements).

In the case where two probes have seized and indicate mutually inconsistent values, then the checking modules 14,15,16 would all indicate a defect of consistency. The sideslip values measured by the probes would not then be taken into account by the computer C1.

Presupposing now that the two probes 1 and 3 give erroneous but mutually consistent values, the application of the triplex principle would eliminate probe 2 giving the correct information. The device according to the invention makes it possible conversely to detect, at the level of the comparison Δfiltered1/3 and αfiltered that Δfiltered1/3 is incorrect in view of the incidence signal and therefore to deduce therefrom an inconsistency between probes 1 and 3.

According to the invention, none of the three checking modules 14,15,16 would indicate a consistency and the sideslip values would not be dispatched to the computer C1.

This example is easily transposable to the case where the two probes 2 and 3 give erroneous but mutually consistent values and probe 1 gives the correct information; or else to the case where the two probes 1 and 2 give erroneous but mutually consistent values and probe 3 gives the correct information.

In all cases where a single probe is functional, the device according to the invention makes it possible to indicate to the computer C1 not to take the sideslip measurements into account.

If all the probes are functional, all the consistency checking modules 14, 15,16 indicate the consistency of the measurements and the latter are taken into account by the computer C1 (on condition that the validation means 17 validates the check).

The validation means 17 will now be described, with reference to FIG. 6.

In certain cases of flight, the checking modules for the probes 14, 15,16 cannot operate in an optimal manner. This stems for example from events or from certain conditions identified by the validity parameters P. It is possible to cite in particular:
situation of identified faults with the probes (incidence or sideslip),
situation of ground phases,
situation where the attitude of the aeroplane is such that the consistency check according to the invention is not working,
case where a specific configuration of the aeroplane means that the consistency check according to the invention is inoperative,
situation where the incidence is not validated.

For these reasons, the device possesses a means of validation computation 17, as a function of the validity parameters P.

On output from the validation means 17, a boolean signal 21 indicates the validity or the invalidity of the measurements which are performed in the consistency checking modules 14, 15,16.

It will be possible for the validation means 17 to be provided with the given parameters P by avionic computers, pilots or technicians, or else by computerized ground maintenance means.

If the validation means 17 determines that the validity conditions are not all satisfied, the consistency check is considered to be invalid and the sideslip values of the probes will not be taken into account by the computer C1.

If the validation means 17 determines that the validity conditions are all satisfied, then the consistency check will be considered to be valid and the sideslip values of the consistent probes will be taken into account by the computer C1.

The invention claimed is:

1. A method for verifying consistency of measurements made by a first probe and a second probe where both of the probes are mounted on an aircraft, the first probe providing a first sideslip angle measurement signal $\beta A$ and the second probe providing a second sideslip angle measurement signal $\beta B$, the method comprising:
receiving from the first probe a first sideslip angle measurement signal $\beta A$ and receiving from the second probe a second sideslip angle measurement signals $\beta$, wherein each sideslip angle measurement corresponds to a certain period in the flight of the aircraft;
calculating a difference between the first sideslip angle measurement signal $\beta A$ and the second sideslip angle measurement signal $\beta B$ and generating a discrepancy signal Δsideslip;
filtering the discrepancy signal Δsideslip to generate filtered discrepancy signal Δfiltered;
filtering angle of incidence measurement signal sα for said aircraft corresponding to the period to generate filtered angle of incidence measurement signal αfiltered;
comparing the filtered discrepancy signal Δfiltered and the filtered angle of incidence measurement signal αfiltered;
based on the comparison, detecting an inconsistency between the measurements of the said first probe and second probe, and
determining that the first sideslip angle measurement signals $\beta A$ and second sideslip angle measurement signals $\beta B$ are unusable in response to the detected inconsistency.

2. The method according to claim 1, wherein the filtering of the discrepancy signal Δsideslip comprises:
amplifying the discrepancy signals Δsideslip to obtain an amplified discrepancy signal Δsideslip; and
filtering the amplified discrepancy signals Δsideslip to obtain the filtered discrepancy signal Δfiltered.

3. The method according to claim 2, wherein the comparison step comprises:
subtracting the filtered angle of incidence measurement signal αfiltered from the filtered amplified discrepancy signal Δfiltered to obtain a difference signal;
detecting amplitude discrepancies of the difference signal that are greater than a threshold value;
counting detected amplitude discrepancies;
computing an error density on the basis of the number of detected amplitude discrepancies during a certain period; and comparing the error density with a reference value to provide a boolean signal of consistency generated while error density remains less than said reference value and to provide a boolean signal of inconsistency while the error density is greater than the reference value.

4. The method according to claim 1, wherein the comparison step comprises:
repeatedly calculating the difference between the first sideslip angle measurement signal βA and the second sideslip angle measurement signal βB at instances during a certain period;
calculating differences between the filtered angle of incidence measurement signal αfiltered for each instance and the filtered amplified discrepancy signal Δfiltered for the instance to obtain a difference signal at each instance;
detecting amplitude discrepancies of the difference signals greater than a threshold amplitude value;
counting the detected amplitude discrepancies;
computing an error density on the basis of the number of detected amplitude discrepancies during a certain period; and
comparing the value of the error density with a reference value to provide a boolean signal of consistency, where the value of the error density remains less than said reference value and a boolean signal of inconsistency where the value of the said error density is greater than said reference value.

5. An apparatus for verifying the consistency of measurements comprising:
three probes mounted on an aircraft, the three probes each providing a respective sideslip angle measurement signals;
three checking modules which check the three probes, wherein each of the modules checks for consistency of a respective pair of the three probes and is configured to:
receive inputs of sideslip angle measurement signals generated by the respective pair of the three probes;
calculate differences of the sideslip angle measurement signals at points in time wherein the differences are represented by discrepancy signals Δsideslip;
filter the discrepancy signals Δsideslip to determine filtered discrepancy signals Δfiltered;
receive angle of incidence measurement signals sα for the aircraft at the points in time;
filter the angle of incidence measurement signals sα to determine filtered angle of incidence measurement signals αfiltered;
compare the filtered discrepancy signals Δfiltered and the filtered angle of incidence measurement signals αfiltered to detect inconsistencies between the measurements of the respective pair of the three probes, and
determine that the sideslip angle measurement signals generated by the respective pair of the three probes are unusable in response to the detected inconsistencies.

6. The apparatus according to claim 5, wherein the checking module:
amplifies said discrepancy signals by a gain K; and
filters said amplified discrepancy signals to obtain the filtered discrepancy signals.

7. The apparatus according to claim 6, wherein the comparison includes:
subtracting said filtered angle of incidence measurement signal from said filtered amplified discrepancy signal to obtain a difference signal;
detecting amplitude discrepancies of said difference signal greater than a threshold amplitude discrepancy;
counting each of the detected amplitude discrepancies;
computing an error density by comparing a number of the detected amplitude discrepancies during a certain period with a reference density, and providing a boolean signal as a function of the comparison.

8. The apparatus according to claim 6, wherein each of the three checking modules generate a signal indicating whether the output of the respective pair of probes is valid.

9. The apparatus according to the claim 8, wherein the signal is a boolean signal indicating whether the consistency check performed in each of the said checking modules is valid or invalid.

10. The apparatus according to claim 5, wherein the checking module is further configured to:
subtract the filtered angle of incidence measurement signals from the filtered amplified discrepancy signals to obtain difference signals;
detect amplitude discrepancies when the difference signals are greater than a threshold difference signal value;
count each detected amplitude discrepancy;
compute an error density on the basis of the number of detected amplitude discrepancies during a certain period, and
compare the error density with a reference density and generate a boolean signal as a function of the comparison.

11. The apparatus according to claim 10, wherein each of the three checking modules generates a signal indicating whether the output of the respective pair of probes is valid.

12. The apparatus according to the claim 11, wherein the signal is a boolean signal indicating whether the consistency check performed in each of the said checking modules is valid or invalid.

13. The apparatus according to claim 5, wherein the processor further generates a signal validating or invalidating an output of each of the three checking modules.

14. The apparatus according to the claim 13, wherein the signal validating or invalidating includes a boolean signal indicating whether the consistency check performed in each of the said checking modules is valid or invalid as a function of input validity parameters.

15. An apparatus to verify a consistency of measurements of pairs of probes comprising:
a set of at least three sideslip probes mounted on an aircraft, wherein each of the probes generates a, sideslip angle measurement signal; (β1, β2, β3)
three checking modules each configured to receive the sideslip angle measurement signals from a pair of probes of the at least three probes, wherein a first one of the checking modules receives the sideslip angle measurement signals β1 and β2, a second one of the checking modules receives the sideslip angle measurement signals β1 and β2 and a first one of the checking modules receives the sideslip angle measurement signals β2 and β3, wherein each of the three checking modules is configured to
subtract the received sideslip angle measurement signals to produce a respective discrepancy signal;
at least one processor configured for each of the three checking modules to filter the discrepancy signal and to filter an angle of incidence measurement signal for said aircraft, and to provide a filtered discrepancy signal and a filtered angle of incidence measurement signal, and
subtract the filtered discrepancy signal and the filtered angle of incidence measurement signal, and identify an inconsistency in the received sideslip angle measurement signals.

16. The apparatus according to claim 15, wherein the at least one processor is configured to:
   to amplify said discrepancy signal by a gain K; and
   filter said amplified discrepancy signal to obtain the filtered discrepancy signal.

17. The apparatus according to claim 15, wherein the at least one processor is further configured to:
   to subtract said filtered angle of incidence measurement signal from said filtered discrepancy signal to obtain a difference signal;
   detect amplitude discrepancies of said difference signal that are greater than a predetermined threshold;
   count detected amplitude discrepancies;
   compute an error density based on said the count of detected amplitude discrepancies during a certain period and compare the computed error density with a reference density, and
   generate a boolean signal based on a function of the comparison.

* * * * *